US012597717B2

(12) United States Patent
Jaeger et al.

(10) Patent No.: US 12,597,717 B2
(45) Date of Patent: Apr. 7, 2026

(54) HOUSING ASSEMBLY FOR A PLIER-OPERATED INSULATION-DISPLACEMENT CONNECTOR

(71) Applicant: TE Connectivity Nederland BV, s'Hertogenbosch (NL)

(72) Inventors: Peter Dirk Jaeger, s-Hertogenbosch (NL); Peter Poorter, s-Hertogenbosch (NL); Kartik Thakur, s-Hertogenbosch (NL)

(73) Assignee: TE Connectivity Nederland BV, S-Hertogenbosch (NL)

(*) Notice: Subject to any disclaimer, the term of this patent is extended or adjusted under 35 U.S.C. 154(b) by 409 days.

(21) Appl. No.: 18/309,058

(22) Filed: Apr. 28, 2023

(65) Prior Publication Data

US 2023/0352857 A1 Nov. 2, 2023

(30) Foreign Application Priority Data

Apr. 28, 2022 (EP) .................................... 22170633

(51) Int. Cl.
*H01R 4/2407* (2018.01)
*H01R 12/61* (2011.01)

(52) U.S. Cl.
CPC ......... *H01R 4/2407* (2018.01); *H01R 12/616* (2013.01)

(58) Field of Classification Search
CPC .. H01R 4/2407; H01R 12/616; H01R 12/675; H01R 4/2433; H01R 43/015
USPC .......................................................... 439/395
See application file for complete search history.

(56) References Cited

U.S. PATENT DOCUMENTS

| | | | | |
|---|---|---|---|---|
| 5,242,313 | A | 9/1993 | Logerot et al. | |
| 5,498,172 | A | 3/1996 | Noda | |
| 8,734,180 | B2 | 5/2014 | Derks | |
| 11,251,550 | B1 | 2/2022 | Davidsz et al. | |
| 2005/0070147 | A1 | 3/2005 | Hung | |
| 2005/0227529 | A1* | 10/2005 | Mrakovich .............. | H01R 9/03 439/402 |

(Continued)

FOREIGN PATENT DOCUMENTS

| | | | |
|---|---|---|---|
| CN | 102834976 | B | 6/2016 |
| DE | 102014116490 | A1 | 5/2016 |
| DE | 102019219394 | A1 | 6/2021 |

OTHER PUBLICATIONS

European Search report from the European Patent Office dated Oct. 13, 2022, corresponding to Application No. 22170633.6-1201, 30 pages.

*Primary Examiner* — Tho D Ta
*Assistant Examiner* — Jeffrey Mountain
(74) *Attorney, Agent, or Firm* — Barley Snyder

(57) ABSTRACT

A housing assembly for a plier-operated insulation-displacement connector includes a first housing section and a second housing section. The first housing section and the second housing section are movable with respect to one another. Each of the first housing section and the second housing section has a top surface grippable by a jaw of a plier. The top surface of the first housing section has a concave area in a first direction. The top surface of the second housing section at least one of: has a concave area in the first direction, and is slidably arranged along the first direction with respect to the top surface of the first housing section.

18 Claims, 7 Drawing Sheets

(56) References Cited

U.S. PATENT DOCUMENTS

| | | | | |
|---|---|---|---|---|
| 2008/0081507 | A1* | 4/2008 | Mahajan | H01R 12/616<br>439/410 |
| 2008/0293288 | A1* | 11/2008 | Caveney | H01R 25/142<br>29/854 |

* cited by examiner

HOUSING ASSEMBLY FOR A PLIER-OPERATED INSULATION-DISPLACEMENT CONNECTOR

CROSS-REFERENCE TO RELATED APPLICATIONS

This application claims the benefit of the filing date under 35 U.S.C. § 119(a)-(d) of European Patent Application No. 22170633.6, filed on Apr. 28, 2022.

FIELD OF THE INVENTION

The invention relates to a housing assembly for a plier-operated insulation-displacement connector.

BACKGROUND

Insulation-displacement connectors or, IDC connectors in short, connect to one or more conductors of a cable with a cable insulation by forcing ID contacts (insulation displacement contacts) through the insulation. The number of ID contacts corresponds to the number of conductors that are to be connected. Use of insulation-displacement connectors obviates the need to remove the insulation before connecting the contacts of the connector with the conductors.

In plier-operated insulation-displacement connectors, the force necessary to cut through the insulation is generated by pliers. However, with these connectors there is a risk that the housing assembly may become damaged or that short-circuits between the conductors are created if the pliers are not handled carefully.

SUMMARY

A housing assembly for a plier-operated insulation-displacement connector includes a first housing section and a second housing section. The first housing section and the second housing section are movable with respect to one another. Each of the first housing section and the second housing section has a top surface grippable by a jaw of a plier. The top surface of the first housing section has a concave area in a first direction. The top surface of the second housing section at least one of: has a concave area in the first direction, and is slidably arranged along the first direction with respect to the top surface of the first housing section.

BRIEF DESCRIPTION OF THE DRAWINGS

Exemplary embodiments of the invention are described by way of the following drawings. In the drawings.

DETAILED DESCRIPTION OF THE EMBODIMENT(S)

Figure 1:
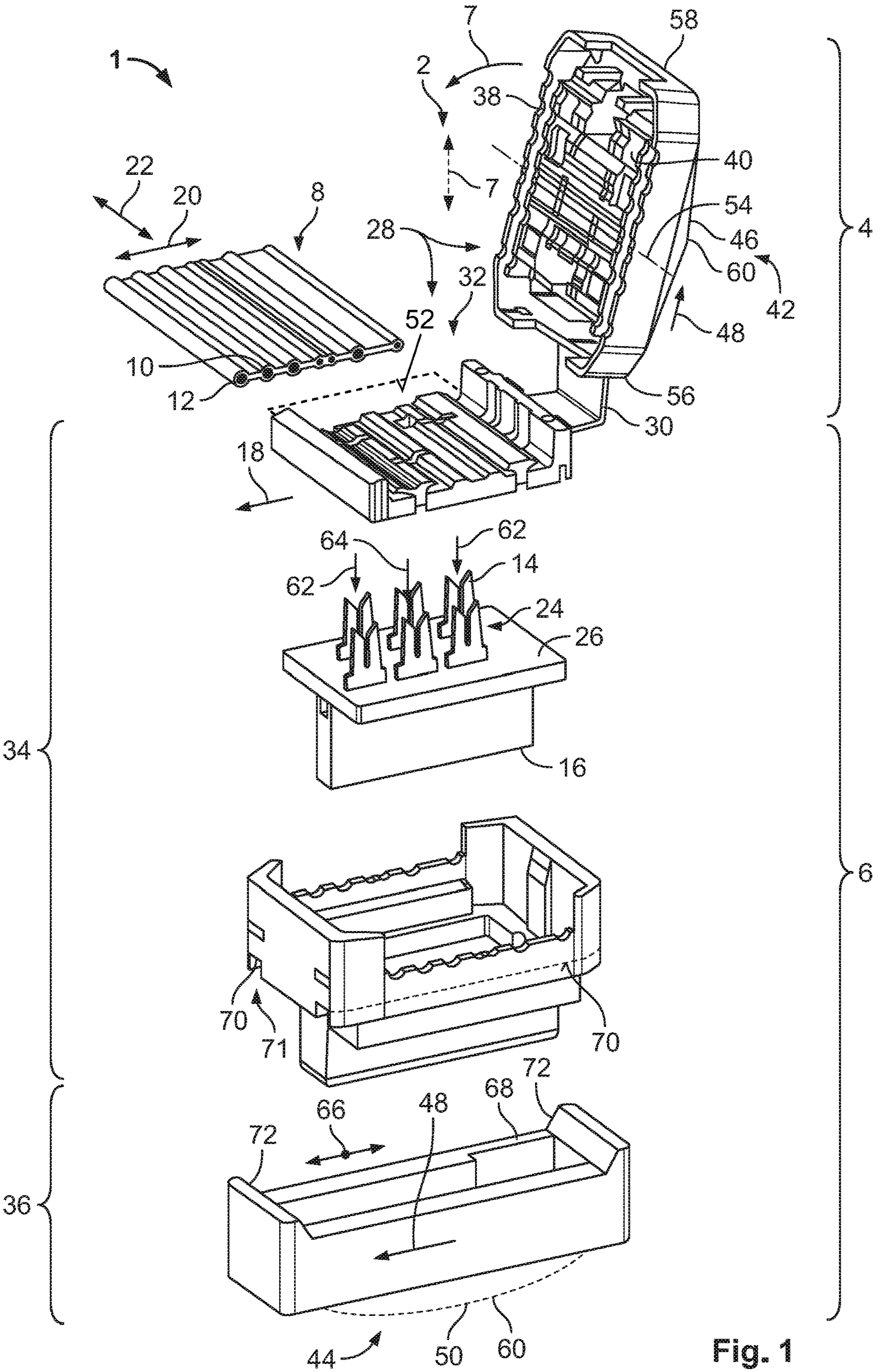
FIG. 1 is an exploded perspective view of a plier-operated insulation-displacement connector with a housing assembly.

In the following, the invention is exemplarily described with reference to the drawings. The combination of features that are shown in the embodiments can be changed as explained herein. For example, a feature may be omitted from an embodiment if its technical effect is not necessary in a particular application. Conversely, a feature described herein and not included in a specific embodiment may be added if the technical effect of this feature is an advantage in a particular application. In the drawings, identical reference numerals are used for elements that correspond to one another with respect to structure and/or function.

First, the general structure of a housing assembly 1 for a plier-operated insulation-displacement connector 2 is described with reference to FIG. 1.

The housing assembly 1 comprises two housing sections 4, 6 that are movable with respect to one in an assembly direction 7 for assembly, i.e. to contact a cable 8, which may in particular be a ribbon cable. The assembly direction may be a linear or a rotational direction, or a combination of both. The cable 8 may have one or more conductors 10 which are embedded in an insulation 12. To cut through the insulation 12, the plier-operated insulation-displacement connector may comprise one or more ID contacts 14. The number of ID contacts 14 and their arrangement should correspond to the number and arrangement of conductors 10 that are to be contacted. Each ID contact 14 may be electrically connected to a contact of a connector section 16 of the housing assembly 1. A connector section 16 may not be present if the housing assembly is part of e.g. a PCB.

In the case of a ribbon cable 8, the ID contacts 14 may be arranged successively in a lateral direction 18, which corresponds to a width direction 20 of the ribbon cable 8. The lateral direction 18 is perpendicular to a longitudinal direction 22 of the ribbon cable 8 and corresponds to the direction in which conductors 10 are arranged side-by-side.

If there is insufficient space between adjacent conductors 10 that need to be contacted by adjacent ID contacts 14, the successive arrangement of the ID contacts 14 may comprise more than one row 24.

The ID contacts 14 may be arranged on a separate element of the connector 2, e.g. a ID contact holder 26, which may be a printed circuit board or printed circuit board assembly. Alternatively, the ID contacts 14 may be integrated in one of the housing sections 4, 6.

The housing assembly 1 may comprise a wire organizer 28, which may be formed jointly by the first and second housing sections 4, 6. The wire organizer 28 is configured to hold and align the cable 8 in a pre-determined position so that the conductors 10 are correctly positioned relative to the ID contacts 14.

Each of the two housing sections 4, 6 may comprise one or more parts. For example, FIG. 1 shows an embodiment where a first housing section 4 comprises only a single housing element and the second housing section 6 comprises two housing elements. The first housing section 4 may be materially connected to the second housing section 6. For example, a hinge 30 may connect the first and the second housing section 4, 6. In this case, the assembly direction 7 may be an essentially pivotal motion in that the two housing sections 4, 6 are folded shut during assembly. In another embodiment, the first housing section 4 and the second section housing 6 may be separate elements but configured to be captively mounted to one another, e.g. by being latched together. In such a configuration, the two housing assemblies may be translationally moved for assembly, as indicated by the dotted arrow for the assembly direction 7 in FIG. 1.

A cable receptacle 32 is formed between the first housing section 4 and the second housing section 6. The ID contacts 14 may protrude into the cable receptacle 32. The cable receptacle 32 is configured to receive the cable 8. The cable receptacle 32 may extend through the housing assembly 1 and form a cable channel through the housing assembly 1. The contour of the cable receptacle 32, in an embodiment, corresponds to the contour of the cable 8 in a plane perpendicular to the longitudinal direction 22 in order to ensure a snug fit between the cable receptacle 32 and the cable 8.

As exemplarily shown in FIG. 1, the second housing section 6 may comprise an upper element 34 and a lower element 36. The terms "upper" and "lower" serve only as distinction, not as a positional reference with respect to e.g. gravity. In this embodiment, the ID contact holder 26 may be arranged between the lower element 36 and the upper element 34. In other embodiments, the ID contact holder 26 may be inserted into the lower element 36 or integrated into the upper element 34 instead of being a separate part. In another alternative embodiment, the upper element 34, the lower element 36 and the ID contacts 14 may all be integrated into a single, integral, second housing section 6.

The upper element 34 may comprise the connector section 16 which allows electric access to the ID contacts 14 and the conductors 10, respectively. The lower element 36 may be captively connected to the upper element 34, e.g. in that both elements 34, 36 are latched together.

In another embodiment, the lower element 36 may be loosely attached to the upper element 34. In again another variant, the upper element 34 may simply be freely supported by the lower element 36. Any of these variants are meant to be encompassed by the term "second housing section".

To mount the housing assembly 1 or the plier-operated insulation-displacement connector 2 onto the cable 8, the first housing section 4 and the second housing section 6 are moved towards each other with the cable 8 interposed between the first housing section 4 and the second housing section 6. The first housing section 4 may comprise one or more pushing surfaces 38, which press against the cable 8 if the first housing section 4 and the second housing section 6 are moved towards each other.

The first housing section 4 may further comprise pockets 40. Each pocket 40 may be configured to receive the part of an ID contact 14 that extends into the cable receptacle 32. Each pocket 40 is located opposite an ID contact 14. Thus, while the pushing surfaces 38 push against the cable 8, the ID contacts 14 enter the respective pockets 40 when penetrating the cable 8. In this process, the insulation 12 is displaced and the ID contact 14 may contact the respective conductor 10.

In a plier-operated insulation-displacement connector 2, the first housing section 4 and the second housing section 6 are moved towards on another using hand-operated pliers. This is explained in further detail in the following.

Each of the two housing sections 4, 6 comprises a top surface 42, 44. The top surfaces 42, 44 face in opposite directions and away from the cable receptacle 32. The two top surfaces 42 are configured as gripper surfaces for the pliers, i.e. they are the designated surfaces where the jaws of the pliers are brought into contact with the housing assembly 1.

The top surface 42 of the first housing section 4 comprises an area 46, which is concave or concavely curved in a first direction 48. The direction 48 should correspond to the lateral direction 18 and/or the width direction 20 of the cable 8 in the fully mounted state of the housing assembly 1.

The top surface 44 of the second housing 6 may also comprise a concave area 50. If present, the concave area 50 is concave or concavely curved also in the direction 48 if the housing assembly 1 is assembled.

Figure 2:
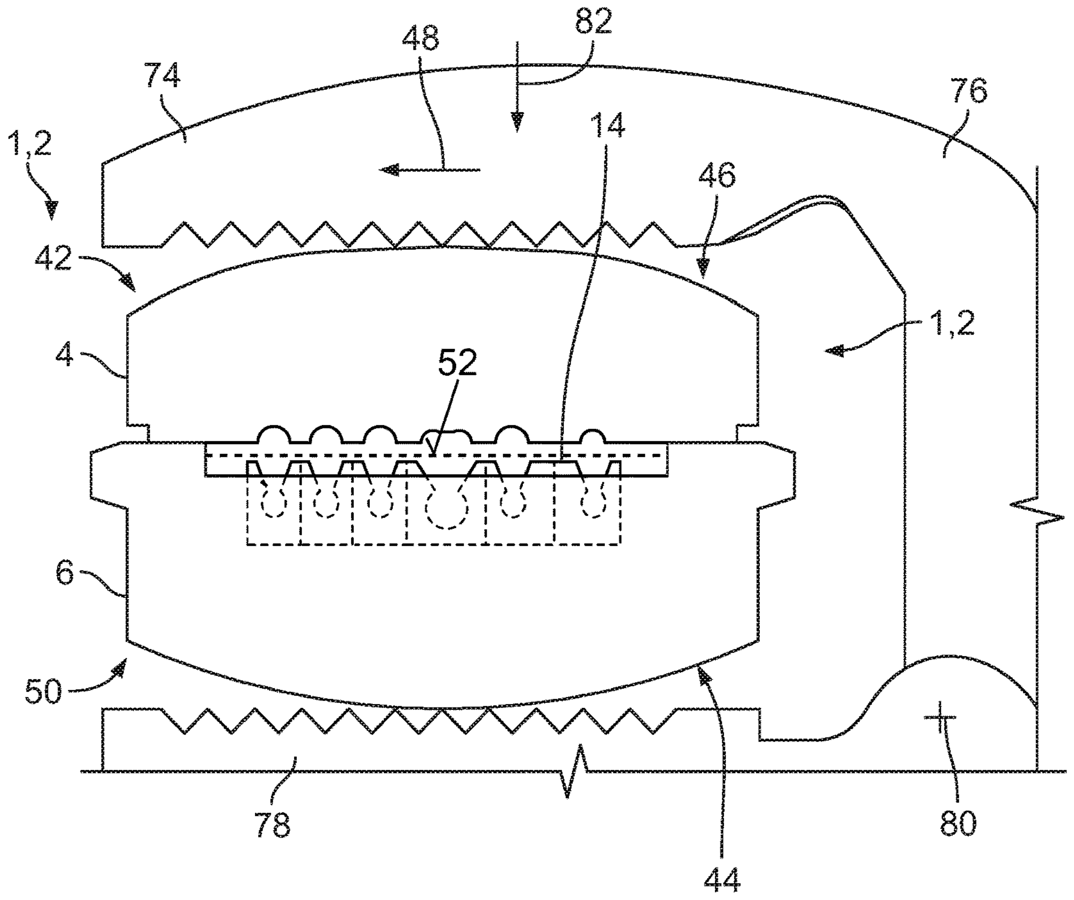
FIG. 2 is a schematic view of a variant of the housing assembly in an initial state.

The term "concave" is used in the various embodiments herein from the perspective of an area interior to the housing sections 4, 6. As shown in FIG. 2, a shape of the housing sections 4, 6 in the area 46 and the area 50 viewed from an exterior may be considered convex, but the shape of the interior curvature of the housing sections 4, 6 in the areas 46, 50 is "concave" or concavely curved, as the term is used herein, to form the exterior shape. Any of the concave areas 46, 50 may be configured as follows.

The concave area 46, 50 may extend in the first direction 48 over more than half of the respective surface 42, 44. In particular, the concave area 46, 50 may cover the area where the ID contacts 14 are arranged. In the mounted state of the housing assembly 1, the concave area 46, 50 comprises a base area in a plane which is parallel to a plane 52 of the cable receptacle 32. The base area may fully cover the area in the plane 52 where the ID contacts 14 are arranged. At minimum, however, at least two ID contacts 14 which follow one another in the first direction 48 should be covered. In an embodiment, all ID contacts 14 are covered by the concave area 46, 50, i.e. lie underneath the concave area 46, 50 in a direction which is directed from the first to the second housing section 4, 6 in the assembled state.

A curvature or, synonymously, a radius of curvature of the concave areas 46, 50 may not be constant but may change along the first direction 48. If a concave area 50 is provided in the second housing section 6, its curvature and/or its change of curvature along the direction 48 may be different from the curvature and/or change of curvature of the concave area 46 of the first housing section 4.

The curvature 46, 50 may be asymmetric with respect to a centerline 54 of the respective top surface 42, 44. The center line 54 extends along the longitudinal direction 22 of the cable 8, i.e. the direction in which the cable receptacle 32 extends through the housing assembly 1. The center line 54 is located in the middle between a first end 56 and a second end 58 of the respective top surface 42, 44. The two ends 56, 58 are located at opposite ends in the first direction 48. The area of curvature 46, 50 may, as shown in FIG. 1, extend from the end 56 to the end 58. Alternatively, the area of curvature 46, 50 may end at a distance from at least one of the ends 56, 58.

The area of curvature 46, 50 is curved only in the direction 48. In a direction perpendicular to the first direction 48, i.e. in the longitudinal direction 22, the area of curvature 46, 50 is linear or straight.

An apex 60 of the concave area 46, 50 is spaced apart from the center line 54 along the first direction 48. Thus, the apex 60 of the concave area 46, 50 may be closer to one of the ends 56, 58 than to the other one of the ends 56, 58. This may be advantageous if the cable 8 comprises a plurality of conductors 10 of different sizes, for example conductors 10 for transmitting signals and conductors for transmitting power.

When the housing assembly 1 is operated so that the ID contacts 14 displace the insulation 12 of the cable 8, each ID contact 14 requires a predetermined force 62 for cutting. The force required by each ID contact 14 may be computed analytically, e.g. by using a FEM model, and/or determined experimentally with sufficient accuracy. The (vectorial) sum of all forces 62 corresponds to an equivalent resulting force 64. The apex 60 of the curvature 46, 50, is located in an embodiment at a position in the first direction 48, which corresponds to the application point of the resulting force 64 from the individual forces 62.

The curvature of the concave area 46, 50 may, as shown in FIG. 1, increase towards the apex 60. At the apex 60, the curvature may be larger than the extent of the top surface 42, 44 in the first direction 48.

In addition, or as an alternative to the concave area 50, the top surface 44 of the second housing section 6 may be slidable along the first direction 48 with respect to the top surface 42 of the first housing section 4. For this, the upper element 34 may be arranged slidably on the lower element 36. The sliding motion is schematically shown at reference numeral 66. The lower element 36 may, e.g. provide a lower sliding surface 68 along which an upper sliding surface 70 of the upper element 34 slides. The upper sliding surface 70 may be arranged in a guiding groove 71, in which the lower sliding surface 68 may be received.

The lower element 36 may further provide one or more limit stops 72 to limit the travel of the upper element 34 in the first direction 48 relative to the lower element 36. The limit stops 72 may e.g. be formed by wall elements of lower element 36. In another embodiment, the limit stops may not be used.

The lower element 36 may be a part of the second housing section 6 only during assembly of the housing assembly 1 and form a reusable tool which may be used for assembly of further housing assemblies 1. The lower element 36, in this configuration, is considered as part of the second housing assembly during assembly.

Next, the function of the housing assembly 1 is explained with reference to FIGS. 2 to 7.

Figure 3:
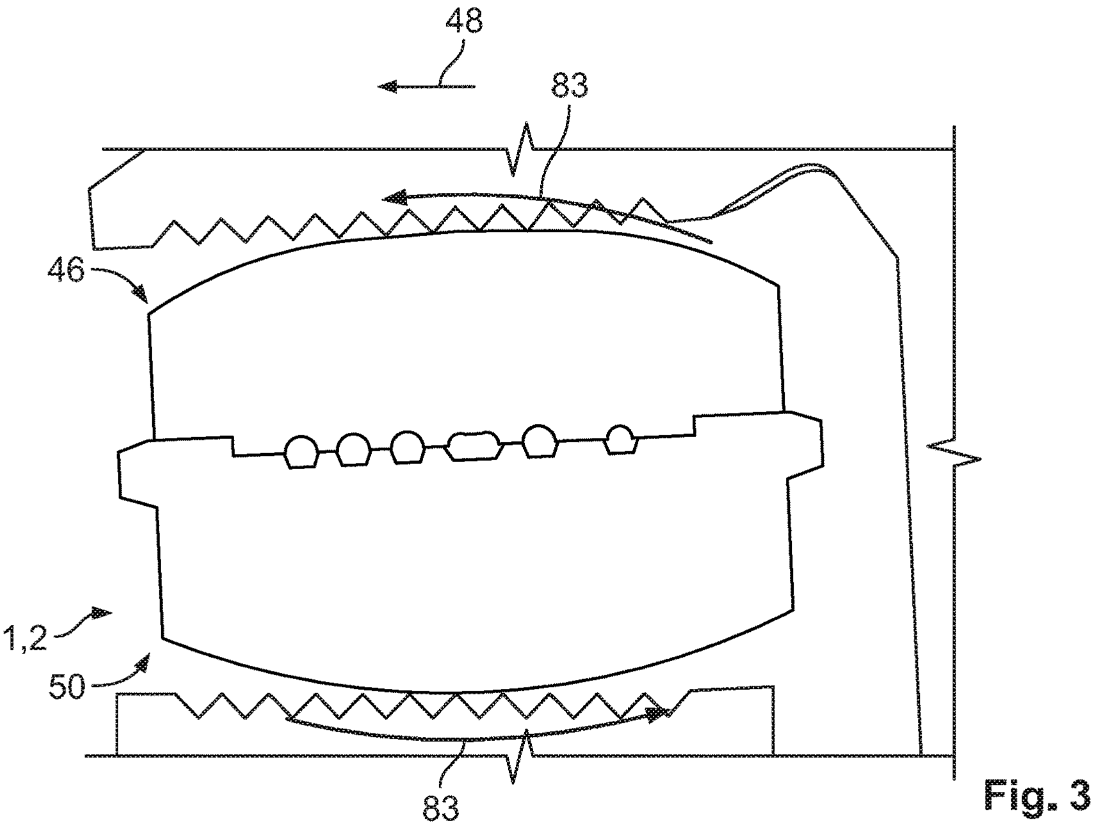
FIG. 3 is a schematic view of a variant of FIG. 2 in a fully assembled state.

FIGS. 2 and 3 show a housing assembly 1 with curved or concave areas 46, 50 on the respective opposite top surfaces 42, 44. In FIG. 2, the housing assembly 1 is shown in an initial position where the first housing section 4 and the second housing section 6 have been put together but are not yet fully assembled. The top surface 42 of the first housing section 2 is gripped by an upper jaw 74 of pliers 76. The top surface 44 of the second housing section 6 is in contact with a lower jaw 78 of pliers 76. This arrangement is just an example. The housing assembly 1 may also be turned upside down in the pliers 76 so that the second housing section 6 is in contact with the upper jaw 74 and the first housing section 4 is in contact with the lower jaw 78. In any case, the first direction 48, i.e. the direction in which the top surfaces 42, 44 are curved, should be parallel to the longitudinal direction of the jaw 74.

To move the first housing section 4 and the second housing section 6 towards one another, the pliers 76 are operated. The pliers 76 may have a non-parallel action, so that at least one of the jaws 74 rotates about a pivot axis 80 of the pliers 76. Taking e.g. the second housing section 6 in FIG. 2 as a reference, the upper jaw 74 performs a pivoting motion 82 about the pivot axis 80. Due to this pivoting motion, the angle between the upper jaw 74 and the lower jaw 78 will change if the first housing section 4 is moved closer to the second housing section 6 and the jaws 74, 78 are closed.

In an embodiment, a curvature or, synonymously, a radius of curvature of the at least one concave area 46, 50 may change along the first direction 48. This has the effect that the center of rotation of the housing assembly 1 in the jaws 74, 78 of the pliers 76 may change with the angle of attack of the jaw 74, 78 of the pliers 76. Thus, the force applied by the pliers may be properly directed with respect to the ID contacts independent of the rotation of the housing assembly 1 between the jaws 74, 78.

This is shown in FIG. 3, where the housing assembly 1 is shown in the fully assembled state, i.e. the first housing section 4 and the second housing section 6 have reached their closest distance and are latched together. Because both top surfaces 42, 44 are provided with the concave areas 46, 50, the housing assembly 1 may perform a rolling motion 83 between the two jaws 74, 78 upon their closure. The point of contact between at least one of the jaws 74, 78 and the corresponding top surface 42, 44 may move in the direction 48 during the closing motion. This reduces shearing forces within the housing assembly 1 between the first housing section 4 and the second housing section 6. Consequently, damage to the housing assembly 1 and short-circuits due to a shifting motion between the ID contacts 14 and the cable 8 are prevented.

The same effect is achieved if, instead of a concave area 50 on the top surface 44 of the second housing section 6, the top surface 44 of the second housing section 6 is allowed to slide along direction 48 relative to the top surface 42 of the first housing section 4. This is explained with reference to FIGS. 4 and 5. Again, FIG. 4 shows the housing assembly 1 in an initial position, while FIG. 5 shows the housing assembly 1 of FIG. 4 in the fully assembled state.

Figure 4:
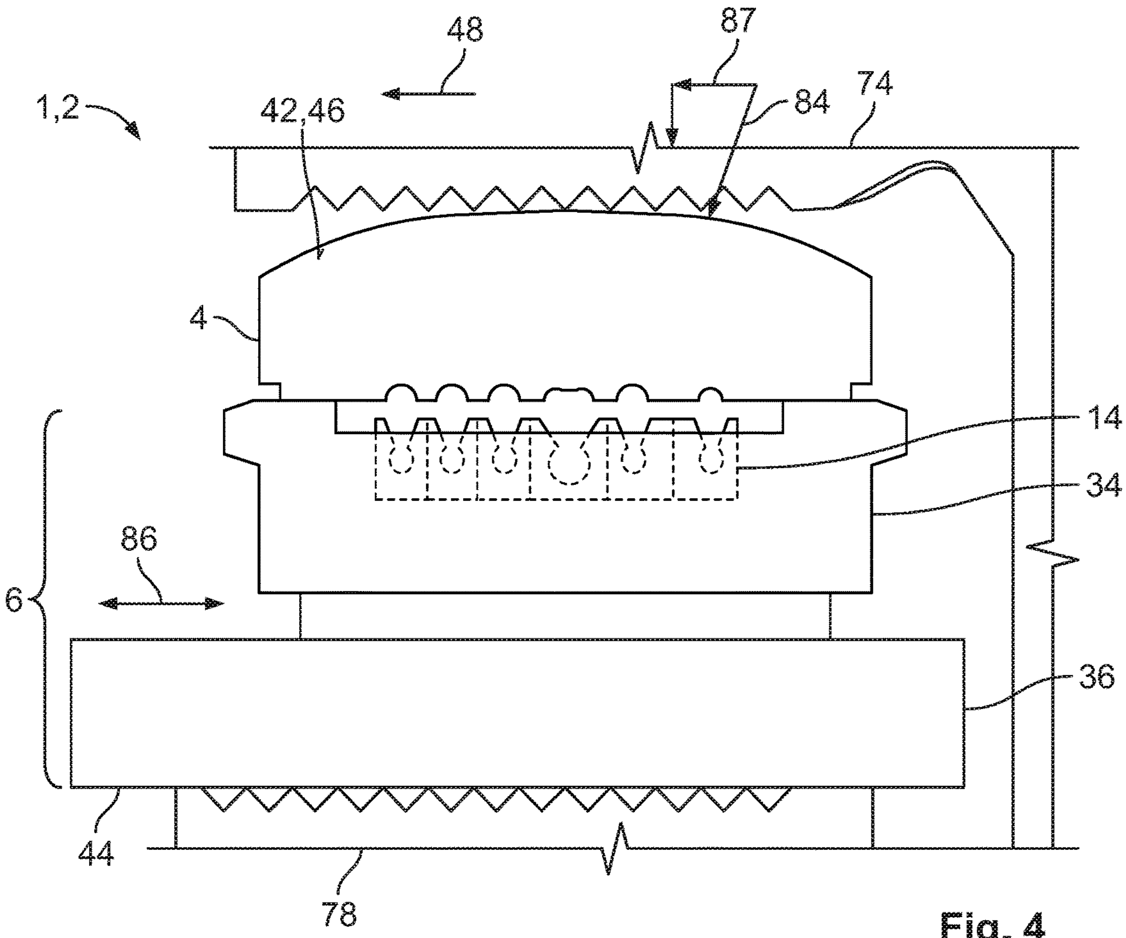
FIG. 4 is a schematic view of a variant of the housing assembly in an initial state.
Figure 5:
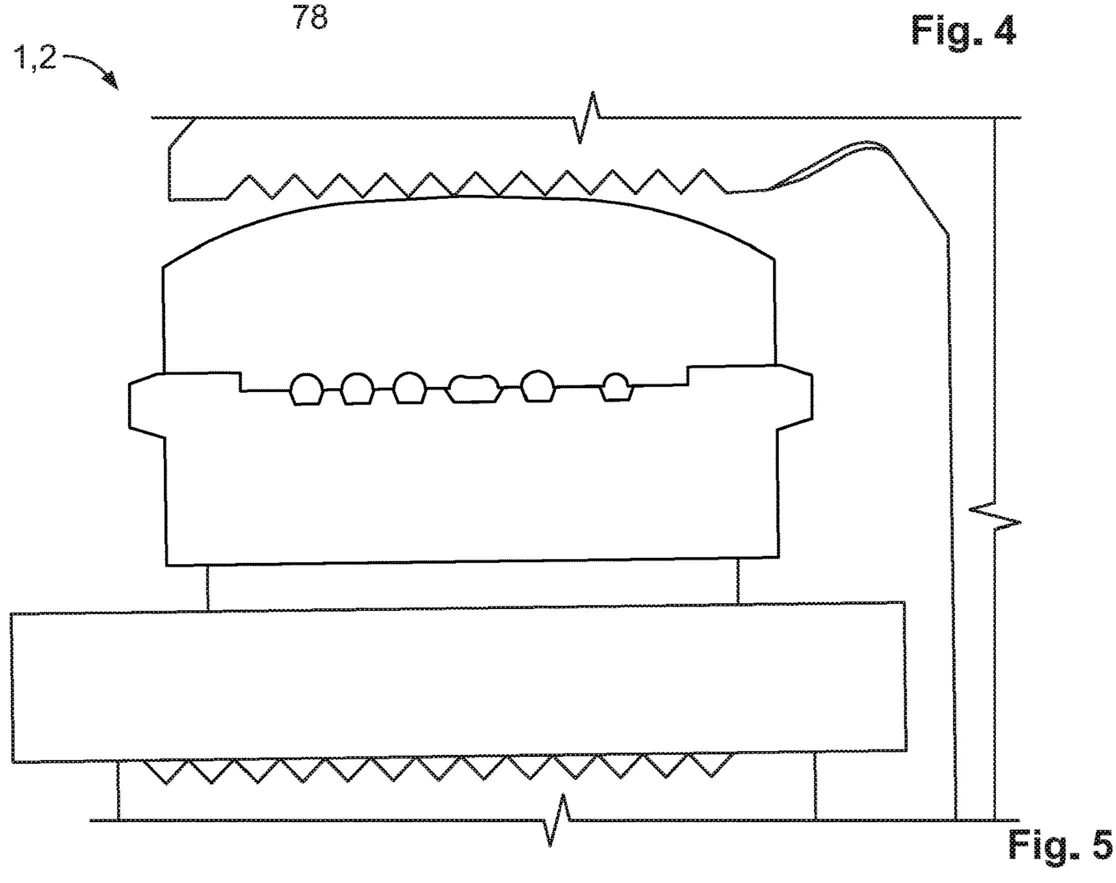
FIG. 5 is a schematic view of the housing assembly of FIG. 4 in a fully assembled state.

In the embodiment of FIGS. 4 and 5, the top surface 44 of the second housing section 6 is planar so that the jaws 78, which also provide a planar surface, may fully rest against the top surface 44. A pivoting motion between the jaw 78 and the top surface 44 as with the embodiment of FIG. 2 where the top surface 44 is concave is not possible in this configuration.

The top surface 42 of the first housing section 4 is, however, curved. Upon closing of the jaws 74, 78, the jaw 74, which is in contact with the concave area 46, will roll along the curved area 46. If, in course of this relative rolling motion, a force 84 which acts on the concave area 46, acts at an oblique angle with respect to the top surface 46 of the second housing 4, a shifting motion 86 is generated due to a component 87 of the force 84, which acts parallel to the top surface 44. The sliding motion 86, which takes place between the two top surfaces 42, 44, avoids shear stresses in the housing assembly 1, in particular between the first housing section 4 and the second housing section 6. Due to this, the risk of damages to the housing assembly 1 and/or of short-circuits in the cable 8 is reduced.

After the fully assembled state, as shown in FIG. 5, is reached, the lower element 36 may be removed and reused for assembly of another housing assembly 1, if the lower element 36 is designed as a removable tool, as was explained above. Alternatively, the lower element 36 may be captively held by the upper element 34 and remain with the housing assembly 1.

Figure 6:
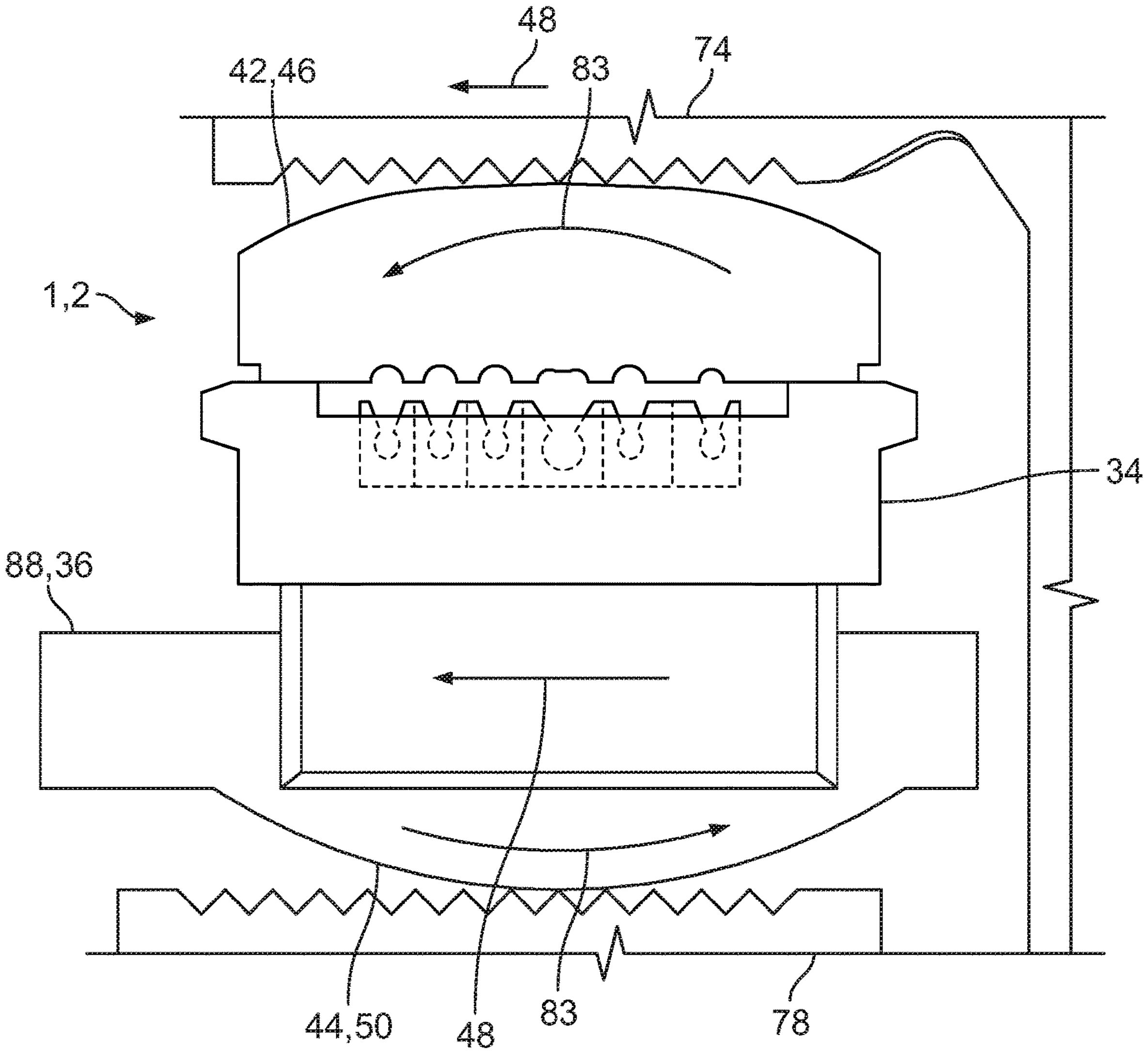
FIG. 6 is a schematic view of a variant of the housing assembly in an initial state.
Figure 7:
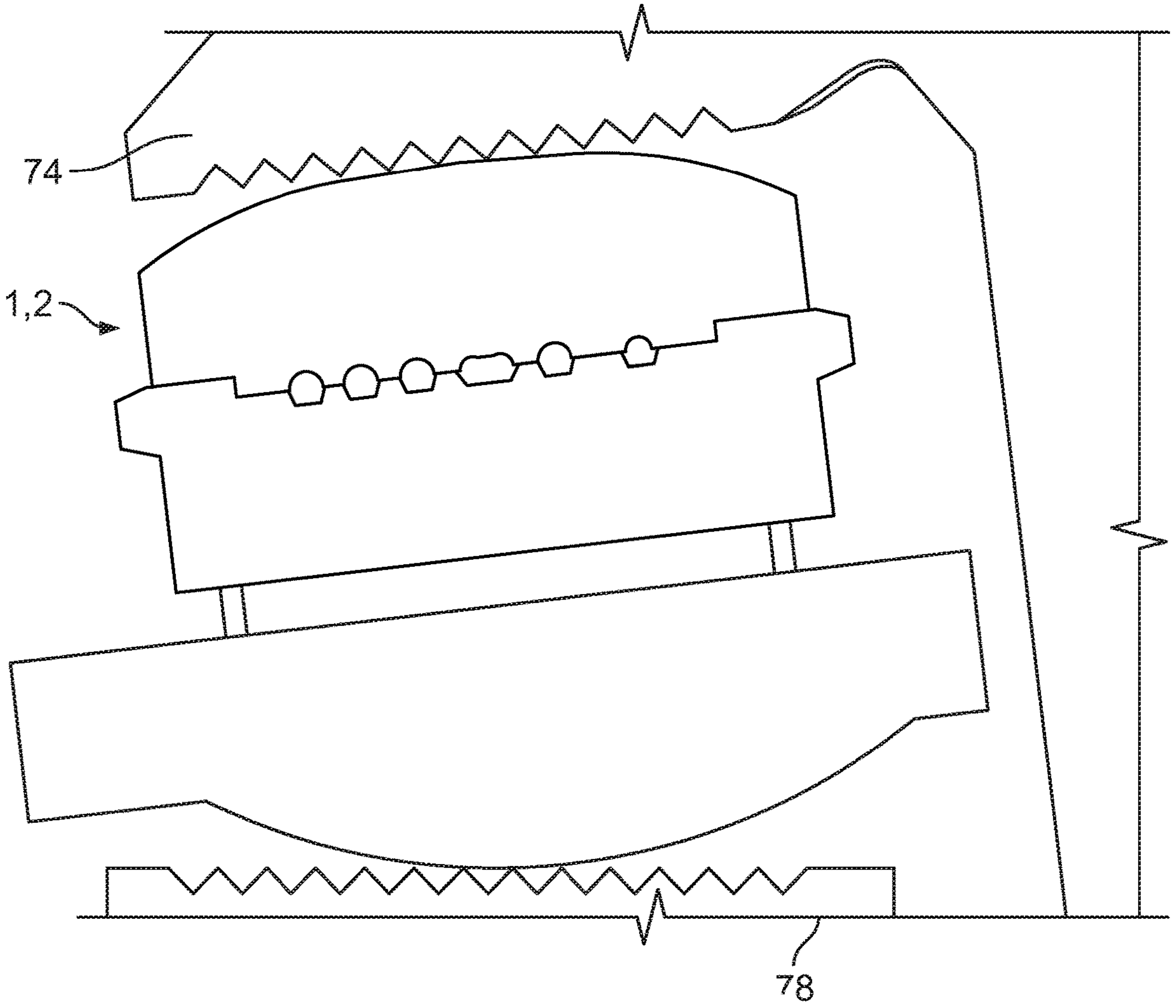
FIG. 7 is a schematic view of a variant of FIG. 6 in a fully assembled state.

In FIGS. 6 and 7, a housing assembly 1 is shown where the top surface 42 comprises or consists of a concave area 46 and the opposite top surface 44 also comprises or consists of a concave area 50. Additionally, the top surface 44 is arranged on a lower element 36 which provides a slider support 88 on which the remaining housing assembly 1 with the opposed concave area 46 is supported slidingly along the first direction 48. Thus, the embodiment shown in FIGS. 6 and 7 corresponds to a combination of the embodiments shown in FIGS. 2 to 5. In this case, the housing assembly 1 may perform both a rolling motion 83 between the jaws 74, 78, while at the same time, the top surface 42 and the top surface 44 may slide with respect to one another in the first direction 48 when the jaws 74, 78 are closing.

In this configuration, the shearing stresses within the housing assembly 1, especially between the first housing section 4 and the section housing section 4, can even be further decreased with respect to the embodiments of FIGS. 2 to 5.

Again, the lower element 36 may be a replaceable tool or may stay attached to the upper element 34.

Figure 8:
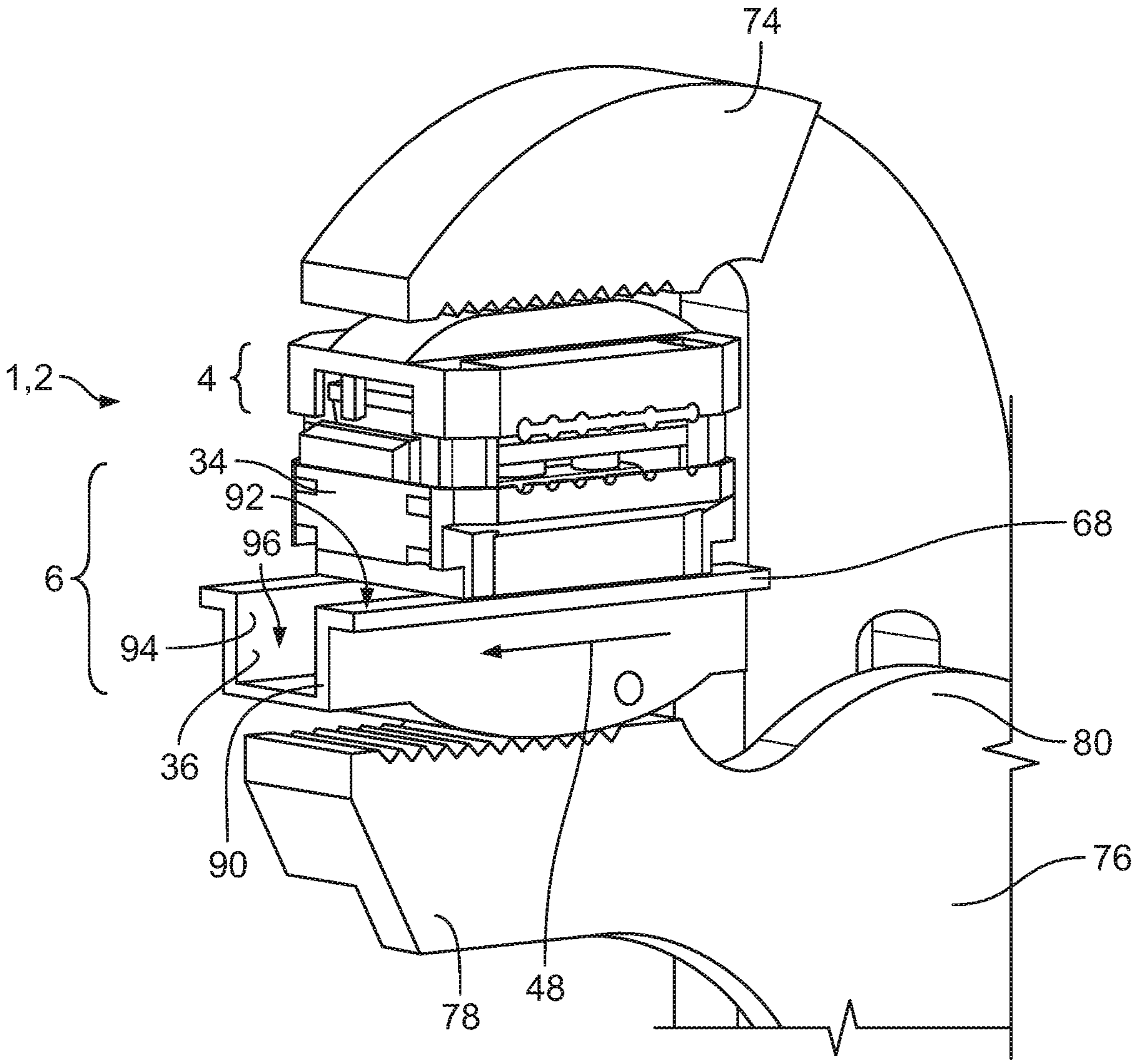
FIG. 8 is a perspective view of a plier-operated insulation-displacement connector.

In FIG. 8, a schematic view of an embodiment of the housing assembly 1 and the connector 2 is shown in an initial state. The embodiment of FIG. 8 functionally corresponds to the embodiment of FIGS. 6 and 7. As can be seen from FIG. 8, the lower element 36 may have an essentially U-shaped cross section having two legs 90 which extends towards the first housing section 4. The ends 92 of the legs 90 may form rail-like sliding surfaces 68.

The upper element 34 may inserted into the space between the two legs 90. The distance between the two opposing legs 90 may correspond to a width of the upper element 34, so that the upper element 34 is limited to a sliding motion along the first direction 48 only. In this case, the side walls 94 of the groove 96 may form a guide along the first direction 48.

Figure 9:
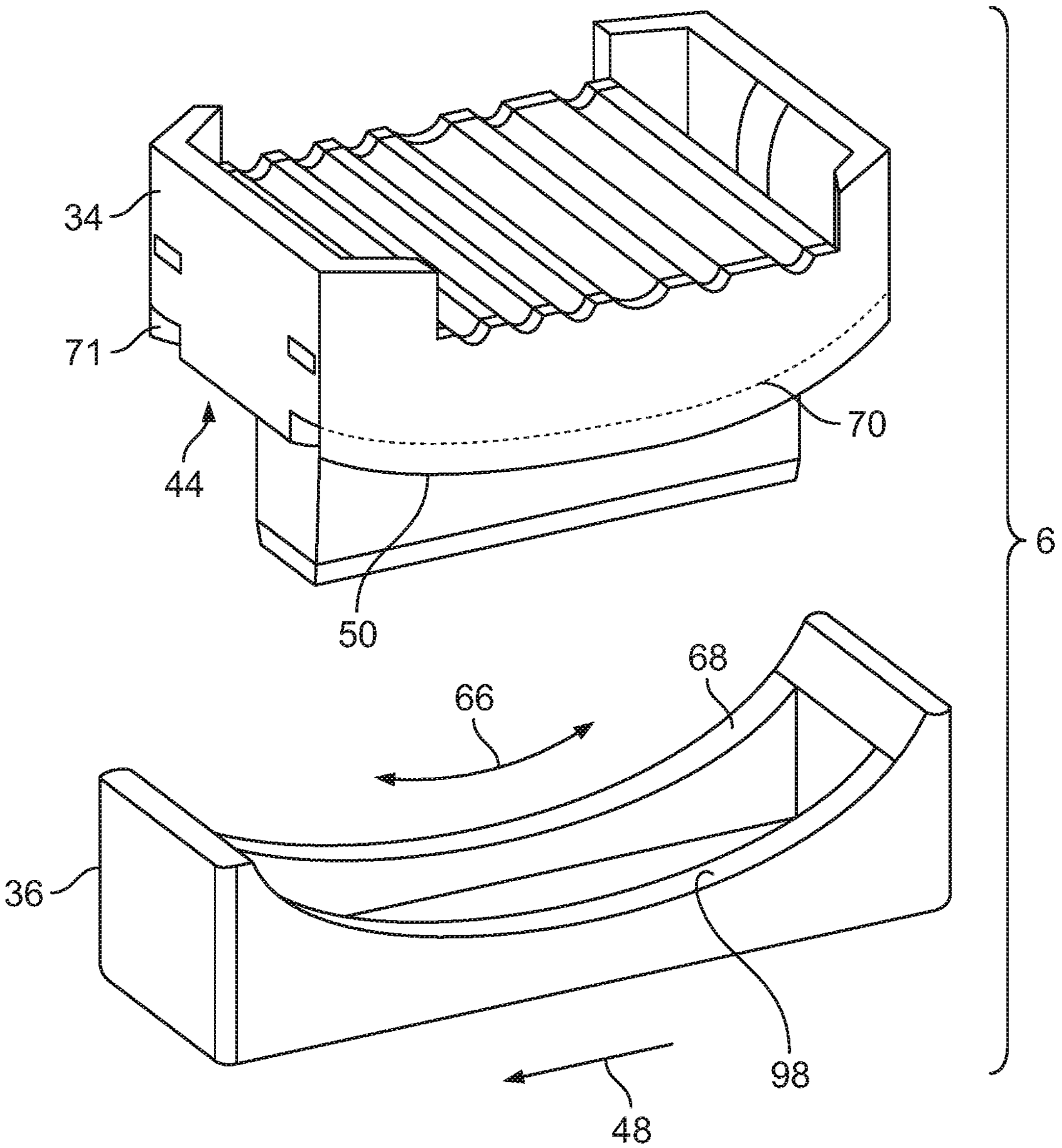
FIG. 9 is a perspective view of parts of another plier-operated insulation-displacement connector.

In FIG. 9, a top surface 44 of the second housing section 6 comprises or consists of a curved area 50, which as shown in FIGS. 1 to 3. Thus, the upper element 34 may be used without a lower element 36 when assembled with the first housing section 4 by pliers.

However, in FIG. 9, the curved area 50 may also serve as an upper sliding surface 70, thus providing a concave sliding surface. Thus, the upper element 34 may be combined with a re-usable and/or detachable lower element 34 which has a lower sliding surface 68 that is complementary to the upper sliding surface 70. In the example shown, the lower sliding surface thus correspondingly comprises or consists of a convex area 98.

The sliding motion 66 takes place along the concave/convex areas 50, 98 automatically during the sliding.

If the lower element 36 is omitted, the upper element 34 may still rotate within the jaws 74, 78, as shown in FIGS. 2 and 3.

This solution reliably prevents damage to the housing assembly 1 and short-circuits in the cable 8 that is to be contacted. The relative slidability of the first top surface 42 relative to the second top surface 44 avoids shear stresses in the housing assembly 1 which may cause breakage or bending within the housing assembly 1. Providing two concave areas 46, 50 on opposing top surfaces 42, 44 allows for self-adjustment of the housing assembly 1 when the jaws 74, 78 of the pliers 76 are closed. This is particularly advantageous if the pliers 76 do not have a parallel action but comprise pivoting jaws 74, 78. The pivoting jaws 74, 78 may roll along the concave area 46, 50 while being closed and thus may also greatly reduce shear stresses.

The cable receptacle 32 may extend along a longitudinal direction of the cable 8. In case of a ribbon cable in particular, the cable receptacle 32 may define a plane which is parallel to the first direction. Further, the first direction 48 may be perpendicular to the longitudinal direction of the cable 8, i.e. be parallel to a width direction of the cable 8. For ribbon cable, this arrangement has the benefit that during a rolling motion or sliding motion of the housing assembly 1 between the jaws 74, 78 of the pliers 76, the point of application of the force which presses the first and the second housing section 4, 6 together, may move in the width direction. This leads to a more uniform application of this force across the ID contacts.

This successive arrangement may include a staggered arrangement, where multiple rows 24 of ID contacts 14 are provided side-by-side, each row 24 extending along the first direction 48 and being parallel to an adjacent row 24. Such a staggered arrangement may be of advantage if the distance between adjacent conductors 10 in the cable 8 is too small for two ID contacts 14 side-by-side. In such a configuration, it may be beneficial if the at least one concave area extends over the at least two ID contacts 14. The concave area 46, 60 may, in particular, extend over all the ID contacts 14 of the housing assembly 1. This ensures that the force exerted by the jaws 74, 78 of the pliers 76 is always applied above and/or directed through the area in which the ID contacts 14 are arranged. The at least one concave area 46, 60 may cover the entire area in which the ID contacts 14 are arranged.

In one embodiment, the ID contacts 14 may be mounted on or be integrated in one of the two housing sections 4, 6, such as the second housing section 6. In another embodiment, the ID contacts 14 may be part of a separate element which is mounted to the second housing section 6, such as PCBA or PCB.

According to another embodiment, the apex 60 of the at least one concave area 46, 50 may be located at the point of application of a resulting force which results from the sum of the individual cutting forces of the at least two ID contacts 14. This arrangement may ensure that the force exerted by the jaws 74 onto the housing assembly 1 upon its assembly is applied evenly to all ID contacts 14. The individual cutting forces of the ID contacts 14 may be predetermined in the sense that they can be determined analytically and/or experimentally for the type of ID contacts 14 to which an individual ID contact 14 belongs. For example, the cutting force of a large-diameter ID contact 14 for large-diameter conductors 10 may be larger than the cutting force of a small-diameter ID contact 14 for a small-diameter conductor 10.

The center line 54 may extend perpendicular to the first direction 48 and intersect the middle of the top surface 42, 44 in the first direction 48. More specifically, the center line 54 may extend along the longitudinal direction of the cable 8. An asymmetric configuration of the at least one concave area 46, 50 may facilitate handling of the pliers 76, as the jaws 74, 78 of the pliers 76 are often offset to one side of the mouth of the pliers 76.

According to another embodiment, the radius of curvature of the at least one concave area 46, 50 may increase towards the apex 60 of the respective concave area 46, 50. This means that the concave area 46, 50 may become flatter towards the apex 60. This may facilitate a horizontal alignment of the housing assembly 1 within the pliers 76 and thus facilitate proper alignment of the housing assembly 1 in the pliers 76.

A large extent of the at least one concave area 46, 60 in the first direction 48 allows a correspondingly large displacement of the point of application of the force applied by the jaws 74, 78 onto the housing assembly 1 along the first direction 48. The larger this displacement, the smaller the shear forces are within the housing assembly 1.

In another embodiment, a radius of curvature of the at least one concave area 46, 60 may be larger than the length of the respective top surface 42, 44 in the first direction 48 at least in a region adjacent the apex 60. A large radius of curvature leads to a large displacement of the point of application of the force exerted by the jaws 74, 78 onto the housing assembly 1.

Further, in an embodiment, the one concave area 46, 60 may be straight or planar perpendicular to the first direction 48. Thus, at least a linear abutment between the jaws 74, 78 and the at least one concave area 46, 60 is established. In this configuration, the housing assembly 1 cannot wiggle around the first direction 48 when gripped by the jaws 74, 78.

The second housing section 6 may comprise a detachable element 36 and a fixed element 34. The fixed element 34 may, for example, be part of the wire organizer 28 and/or form the cable receptacle 32. The fixed element 34 may be configured to be mounted captively to the first housing section 4 when the housing assembly 1 is fully assembled. The detachable element 36 may be slidingly connected to the fixed element 34 and/or comprise one of the at least two concave areas 46, 50 as described above. In one embodiment, the detachable element 36 may be removably and/or releasably connected to the fixed element 34. For example, the fixed element 34 may simply be placed upon the detachable element 36 without any fixed attachment.

The detachable element 36 may form a reusable tool that can be used for assembly of a plurality of housing assemblies 1, e.g. by being placed underneath the fixed element 34 when the housing assembly 1 is put into the pliers 76, be removed when the assembly is completed and used for the next housing assembly to be put into the pliers 76.

The detachable element 36 may comprise a groove, e.g. by having a U-shape in a plane which is perpendicular to the first direction 48. The detachable element 36 may comprise two side walls 94 that are opposite one another perpendicular to the first direction 48. The fixed element 34 may extend into the groove. The fixed element 34 may be guided by the groove for sliding in the first direction 48. The side walls 94 may form a guide which prevents movement of the fixed element 34 relative to the detachable element 36 perpendicular to the first direction 48. A top end of the two side walls 94 may form a lower sliding surface on which an upper sliding surface of the fixed element 34 is slidingly supported.

The detachable element 36 may, in one embodiment, comprise the concave area 46, 50 of the second housing section 6. This allows to provide both the sliding and the rolling for reducing shear stresses without affecting the outer shape of the fixed element 34 which may be formed according to third party's specifications.

In another embodiment, the upper sliding surface of the upper element may comprise or consist of the curved area 46, 60. This may be combined with a detachable and/or re-usable lower element that has a complementary, in particular convex lower sliding surface. Thus, the sliding motion between the upper and the lower element takes place along a curve. Thus, the sliding motion is automatically combined with a rolling motion when the housing assembly 1 is assembled using pliers 76. In this case, the lower element may be optional, because the upper element may already perform a rolling motion in the pliers 76 due to the two curved areas. The lower element may, in this case have a planar top or gripper surface.

What is claimed is:

1. A housing assembly for a plier-operated insulation-displacement connector, comprising:
- a first housing section; and
- a second housing section, the first housing section and the second housing section are movable with respect to one another, each of the first housing section and the second housing section has a top surface grippable by a jaw of a plier, the top surface of the first housing section has a convex area in a first direction, the top surface of the second housing section has a convex area in the first direction and/or is slidably arranged along the first direction with respect to the top surface of the first housing section, the second housing section has a detachable element and a fixed element, the fixed element is mounted to the first housing section and the detachable element is slidably and removably connected to the fixed element.

2. The housing assembly of claim 1, wherein the convex area of the first housing section and/or the second housing section has an apex spaced apart in the first direction from a center line of the top surface of the first housing section and/or the second housing section.

3. The housing assembly of claim 2, wherein the apex is at a point of application of a resulting force that results in a sum of a plurality of cutting forces of a pair of insulation displacement contacts.

4. The housing assembly of claim 1, further comprising a pair of insulation displacement contacts arranged successively in the first direction.

5. The housing assembly of claim 4, wherein the convex area of the first housing section and/or the second housing section extends over the insulation displacement contacts in the first direction.

6. The housing assembly of claim 1, wherein a curvature of the convex area of the first housing section and/or the second housing section changes along the first direction.

7. The housing assembly of claim 6, wherein the curvature of the convex area is asymmetric with respect to a center line of the top surface of the first housing section and/or the second housing section.

8. The housing assembly of claim 7, wherein the center line extends perpendicular to the first direction and intersects a middle of the top surface in the first direction.

9. The housing assembly of claim 6, wherein the curvature decreases with a distance from an apex of the convex area.

10. The housing assembly of claim 1, wherein the convex area of the first housing section and/or the second housing section extends from a first end of the top surface to a second end of the top surface, the first end and the second end are opposite to one another in the first direction.

11. The housing assembly of claim 1, wherein a radius of curvature of the convex area is larger than the top surface in the first direction.

12. The housing assembly of claim 1, wherein the convex area is planar perpendicular to the first direction.

13. The housing assembly of claim 1, wherein the detachable element has a groove extending in the first direction.

14. The housing assembly of claim 13, wherein the groove has a pair of side walls opposite one another and perpendicular to the first direction, the fixed element extends into the groove.

15. The housing assembly of claim 14, wherein a top end of each of the side walls forms a sliding surface on which the fixed element is slidably supported.

16. The housing assembly of claim 15, wherein the detachable element includes the convex area of the second housing section.

17. The housing assembly of claim 16, wherein the sliding surface includes the convex area.

18. The housing assembly of claim 1, wherein when the detachable element is slidably and removably connected to the fixed element, the detachable element is slidable with respect to the detachable element.

* * * * *